United States Patent

Inoue et al.

[11] Patent Number: 5,839,643
[45] Date of Patent: Nov. 24, 1998

[54] METHOD OF WELD-RECOULPING FRONT COVER AND PUMP SHELL OF TORQUE CONVERTER

[75] Inventors: Koji Inoue; Takashi Ogai, both of Hamamatsu, Japan

[73] Assignee: Kabushiki Kaisha Yutaka Giken, Hamamatsu, Japan

[21] Appl. No.: 853,388

[22] Filed: May 8, 1997

[30] Foreign Application Priority Data

Jun. 17, 1996 [JP] Japan .................................... 8-155527

[51] Int. Cl.⁶ ........................................................ B23K 31/02
[52] U.S. Cl. ........................ 228/119; 228/171; 228/138; 29/889.1
[58] Field of Search .................................... 228/119, 170, 228/171, 138, 135; 29/889.1, 889.5

[56] References Cited

U.S. PATENT DOCUMENTS

| | | | |
|---|---|---|---|
| 4,788,857 | 12/1988 | Myers | 73/118.1 |
| 5,000,366 | 3/1991 | Beattie | 228/6.1 |
| 5,499,755 | 3/1996 | Myers et al. | 228/44.3 |

FOREIGN PATENT DOCUMENTS

| | | |
|---|---|---|
| 62-181752 | 11/1987 | Japan . |
| 5-31310 | 8/1993 | Japan . |
| 7-28257 | 5/1995 | Japan . |
| 7-259952 | 10/1995 | Japan . |

*Primary Examiner*—Samuel M. Heinrich
*Attorney, Agent, or Firm*—Nikaido, Marmelstein, Murray & Oram LLP

[57] ABSTRACT

In a weld-coupling portion 3 which is formed by fitting an inner peripheral surface 2*b* of an end portion of a pump shell 2 to a lower-step surface 4*a* of a stepped portion 4 formed on an outer peripheral surface of an end portion of a front cover 1 of a torque converter and then welding them together while abutting an end surface 2*a* of the end portion of the pump shell 2 with a stepped surface 4*a* of the stepped portion 4 of the front cover 1, the weld-coupling portion 3 is cut down to a level of the lower-step surface 4*a* of the front cover 1 in such a predetermined cutting width as to evenly cut a front cover side and a pump shell side of the weld-coupling portion 3 in order to separate the front cover 1 and the pump shell 2 apart. A new replacement of the pump shell 2N which has an end portion whose length is larger than that of the end portion of a cut pump shell 2C (not illustrated) by the cutting width W is fit to the lower-step surface 4*a* of the stepped portion of the end portion of the cut front cover 1C. The end surface 2*a* of the end portion is abutted with the stepped surface 4*b* of the end portion of the cut front cover 1C to thereby weld-recouple the cut front cover 1C and the new pump shell 2N.

3 Claims, 2 Drawing Sheets

METHOD OF WELD-RECOUPLING FRONT COVER AND PUMP SHELL OF TORQUE CONVERTER

BACKGROUND OF THE INVENTION

1. Field of the Invention

The present invention relates to a method of weld-recoupling a front cover and a pump shell of a torque converter after they are separated from each other at a portion where they are welded out of a necessity of replacing or repairing a part or parts inside a fluid chamber, and then the weld-coupling portion is weld-coupled after the replacing or repairing has been finished. In this specification, the term "weld-coupling" means coupling by means of welding, and the term "weld-recoupling" means coupling again by means of welding.

2. Description of the Related Art

Conventionally, a front cover and a pump shell of a torque converter are coupled together with bolts or by means of welding as disclosed in Japanese Published Unexamined Patent Application No. 259952/1995. The method of coupling with bolts has disadvantages in that the number of parts becomes large because sealing materials must be used and that the coupling. strength is small. As a solution thereto, the method of coupling by means of welding is normally employed. In order to replace or repair a part or parts inside the fluid coupling which has a weld-coupling portion (i.e., a portion that is coupled by welding) as shown in FIG. 1, the following steps are taken. Namely, the weld-coupling portion is cut only at an end portion of the pump shell in order to separate the front cover and the pump shell apart. The pump shell that has thus been cut is disposed, as shown in FIG. 5, such that an inner peripheral surface of an end portion thereof is fit to a lower-step surface c of a stepped portion b which is formed in an outer peripheral surface of an end portion of the front cover "a." In addition, in order to keep that relationship between the front cover "a" and the pump shell d which existed before cutting, they are positioned so as to have a clearance corresponding to the width of a cutting tool (i.e., the cutting width) between a stepped surface e of the front cover "a" and an end surface of the pump shell d. Then, after the front cover "a" and the pump shell d are fixed with a jig (not illustrated), the front cover "a" and the pump shell d are welded together.

According to the above-described conventional method of weld-recoupling the front cover the pump shell, the front cover "a" and the pump shell d are weld-recoupled while maintaining the relationship between the front cover "a" and the pump shell d before cutting. It follows that the welding work must be performed while securing the clearance corresponding to the width of the cutting tool (i.e., the cutting width) between the stepped surface e of the front cover "a" and the end surface of the cut pump shell d. Therefore, there is a disadvantage in that it is difficult to obtain a high assembling accuracy and that, in order to improve the assembling accuracy, a new front cover "a" and a new pump shell d must be used. The present invention has an object of eliminating this kind of disadvantages to thereby provide a method of weld-recoupling a front cover and a pump shell of a torque converter in which the front cover and the pump shell can be weld-recoupled at a high assembling accuracy and in which at least one of the front cover and the pump shell can be re-used at the time of weld-recoupling.

SUMMARY OF THE INVENTION

According to a first aspect of the present invention, the foregoing and other objects are attained by a method of weld-recoupling a front cover and a pump shell of a torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of the end portion of said one thereof with a stepped surface of the stepped portion of the other thereof. The weld-coupling portion is cut down to a level of the lower-step surface of the other thereof in such a predetermined cutting width as to evenly cut a front cover side and a pump shell side of the weld-coupling portion in order to separate the front cover and the pump shell apart. A new replacement of said one thereof is fit to the lower-step surface of the stepped portion of the end portion of the other thereof that has been cut. The new replacement has an end portion whose length is larger by the predetermined cutting width than that of the end portion of said one thereof that has been cut. Thereafter, the front cover and the pump shell are coupled together by welding them again while abutting an end surface of the end portion of the new replacement with a stepped surface of the end portion of the other thereof that has been cut.

In accordance with a second aspect of the present invention, there is provided a method of weld-recoupling a front cover and a pump shell of a torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of the end portion of said one thereof with a stepped surface of the stepped portion of the other thereof. The weld-coupling portion is cut down to a level of the inner peripheral surface of said one thereof at such a predetermined cutting width as to evenly cut a front cover side and a pump shell side of the weld-coupling portion in order to separate the front cover and the pump shell apart. The inner peripheral surface of the end portion of said one thereof that has been cut is fit to a lower-step surface of a stepped portion of a new replacement of the other thereof. The new replacement has a stepped surface positioned towards an end surface of the other thereof by the predetermined cutting width. Thereafter, the front cover and the pump shell are coupled by welding them together while abutting an end surface of the end portion of said one thereof that has been cut with the stepped surface of the new replacement.

In accordance with a third aspect of the present invention, there is provided a method of weld-recoupling a front cover and a pump shell of a torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of the end portion of said one thereof with a stepped surface of the stepped portion of the other thereof. The weld-coupling portion is cut down to a level of the lower-step surface of the other thereof at such a predetermined cutting width as to evenly cut a front cover side and a pump shell side of said weld-coupling portion in order to separate the front cover and the pump shell apart. To the lower-step surface of the stepped portion of the other thereof that has been cut, there are fit, first, a spacer ring having a width equal to the predetermined cutting width in contact with a stepped surface of the other thereof that has been cut and, then, the inner peripheral surface of the end portion of said one thereof that has been cut such that an end surface thereof contacts the spacer ring. Thereafter, the spacer ring, the front cover, and the pump shell are coupled together by welding.

According to the first aspect of the present invention, when the front cover and the pump shell are weld-recoupled after they have been separated apart by cutting the weld-coupling portion, one of the front cover and the pump shell can be reused. According to the second aspect of the present invention, the other of the front cover and the pump shell can be reused. According to the third aspect of the present invention, the above-described one and the other of the front cover and the pump shell can be reused. In addition, in any one of the above-described aspects, the end surface of said one or the other of the front cover and the pump shell is positioned by abutting it with the stepped surface of the other thereof either directly or via the spacer ring. Therefore, the front cover and the pump shell that have been separated by cutting can be weld-recoupled at a higher accuracy.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Embodiments of the present invention will now be explained with reference to the drawings.

Figure 1:
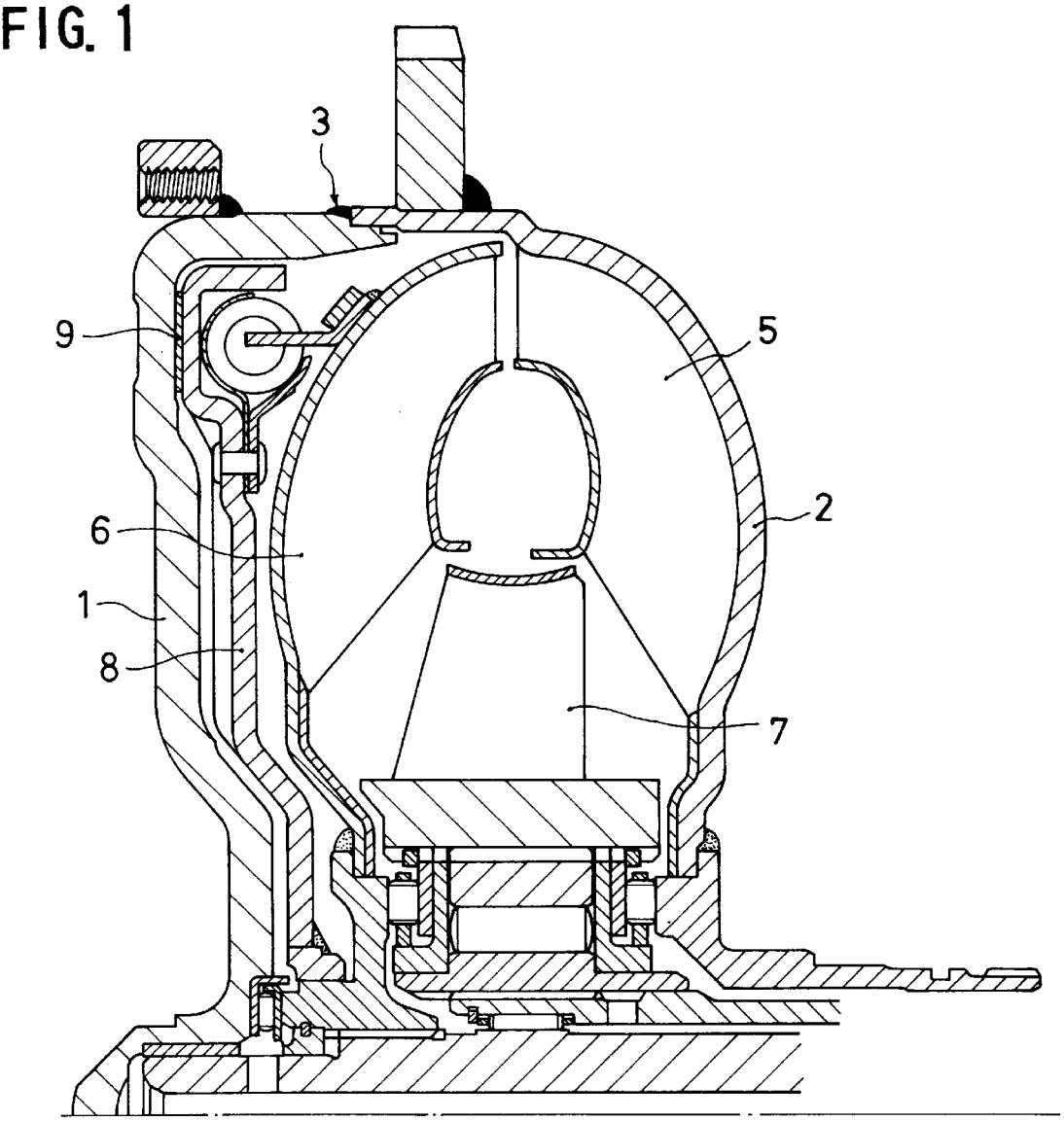
FIG. 1 is a sectional view of a torque converter in which the method of the present invention is performed.

FIG. 1 shows a sectional view of a torque converter in which the method of the present invention is performed.

In the figure, reference numeral 1 denotes a front cover and reference numeral 2 denotes a pump shell. The front cover 1 and the pump shell 2 are welded together at respective end portions thereof to thereby constitute a casing of a torque converter.

As is clearly shown in FIG. 2A, a portion 3 to be weld-coupled (also called a weld-coupling portion 3) of the front cover 1 and the pump shell 2 is constituted as follows. Namely, an inner peripheral surface 2b of an end portion of the pump shell 2 is fit to a lower-step surface 4a of a stepped portion 4 which is formed in an outer peripheral surface of an end portion of the front cover 1.

An end surface 2a of the end portion of the pump shell 2 is abutted with a stepped surface 4b of the front cover 1. The front cover 1 and the pump shell 2 are thus weld-coupled (i.e., coupled by welding). In the pump shell 2 there are integrally formed pump impellers 5. Turbines 6 are provided in a manner to face, or lie opposite to, the pump impellers 5. Between the pump impellers 5 and the turbines 6 there are provided stators 7. A lockup clutch 8 is provided between the front cover 1 and the turbines 6.

According to this arrangement, when a torque is inputted from a rotational member on an input side to the front cover 1, the pump impellers 5 are rotated via the pump shell 2 which is coupled to the front cover 1. Working oil that flows from the pump impellers 5 to the turbines 6 causes the turbines 6 to rotate, and the torque is outputted to the rotational member on an output side. Once the rotational member on the output side has reached a predetermined rotational speed, the lockup clutch 8 is pushed by the working oil pressure towards the front cover 1, and a frictional element 9 which is provided in the lockup clutch 8 is forcibly pressed against a friction surface of the front cover 1. As a consequence, the torque of the front cover 1 is mechanically transmitted from the lockup clutch 8 to the rotational member on the output side via the shell portion of the turbines 6. The energy loss thus becomes smaller, thereby attaining a condition of a better specific fuel consumption of an engine of a motor vehicle in which the torque converter is used.

The constitution and the operation of the above-described torque converter are the same as those known so far.

Next, an explanation will be made about embodiments of a method of weld-recoupling the front cover 1 and the pump shell 2 in the above-described torque converter in case there has arisen the necessity of replacing the frictional element 9 because it has been worn out or damaged.

Figure 2A:
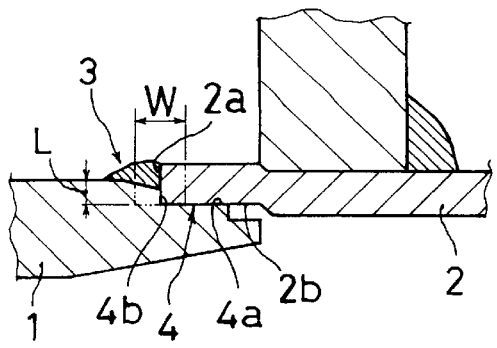
FIG. 2A is a sectional view of a weld-coupling portion of a front cover and a pump shell to perform the present invention.

1) In case a cut front cover 1 is used again and a new pump shell 2 is used in weld-recoupling The weld-coupling portion 3 of the front cover 1 and the pump shell 2 is cut, as shown by dotted lines in FIG. 2A, down to a level L of the lower-step surface 4 of one of the front cover 1 and the pump shell 2 in a predetermined cutting width W, e.g., 3 mm, such that a front cover 1 side and a pump shell 2 side are equally cut by, e.g., 1.5 mm, respectively. The front cover 1 and the pump shell 2 are thus separated from each other.

Figure 2B:
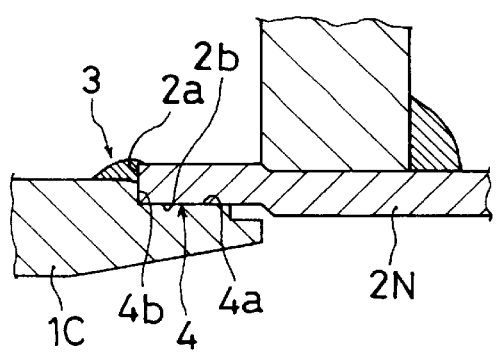
FIG. 2B is a sectional view of a weld-coupling portion of the front cover and the pump shell that have been weld-recoupled according to a first embodiment of the present invention.

A new pump shell 2N as shown in FIG. 2B has an end portion whose length is larger than that of a cut pump shell 2C (not illustrated) by the above-described cutting width W, e.g., 3 mm. As shown in FIG. 2B, the inner peripheral surface 2b of the new pump shell 2N is fit to the lower-step surface 4a of the stepped portion 4 of the above-described cut front cover 1C. The end surface 2a of the end portion of the new pump shell 2N is abutted (or is brought into contact) with the stepped surface 4b of the front cover 1C, and the welding is performed.

According to this method of weld-recoupling, the length from the end portion of the cut front cover 1C to the stepped surface 4b becomes larger than the length from the end portion of the front cover 1 before cutting to the stepped surface by the length which is equivalent to half the cutting width. On the other hand, the new pump shell 2N has the end portion whose length is longer than that of the end portion of the cut pump shell 2C (not illustrated) by the cutting width W. Therefore, when the front cover 1 and the pump shell 2 are weld-recoupled, the relative relationship between the casing and the pump impellers 5, the turbines 6, the stators 7, and the lockup clutch 8 becomes the same as that of the casing before cutting with the above-described elements 5, 6, 7, 8.

2) In case a new front over 1 is used and a cut pump shell 2 is used again in weld-recoupling The weld-coupling portion 3 of the front cover 1 and the pump shell 2 is cut, as shown by dotted lines in FIG. 2A, down to a level L of the inner peripheral surface of the pump shell 2 in a predetermined cutting width W, e.g., 3 mm, such that the front cover 1 side and the pump shell 2 side are equally cut by, e.g., 1.5 mm, respectively. The front cover 1 and the pump shell 2 are thus separated from each other.

Figure 3:
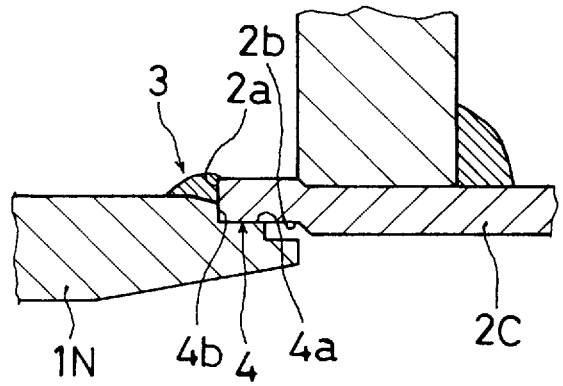
FIG. 3 is a sectional view of the weld-coupling portion of the front cover and the pump shell that have been weld-recoupled according to a second embodiment of the present invention.

A new front cover 1N as shown in FIG. 3 has a stepped surface 4b which is positioned away from the front end of a cut front cover 1C (not illustrated) towards the front end of the new front cover 1N by the above-described cutting width W, e.g., 3 mm.

As shown in FIG. 3, the inner peripheral surface 2b of the cut pump shell 2a is fit to the lower-step surface 4a of the stepped portion 4 of the new front cover 1N. The end surface 2a of the end portion of the cut pump shell 2C is abutted with the stepped surface 4b of the new front cover 1N, and the welding is performed.

According to this method of weld-recoupling, the cut pump shell 2C has the end portion whose length is shorter than that of the end portion of the pump shell 2 before cutting by the length equivalent to half the cutting width. On the other hand, the front end surface 4b of the new front cover 1N is positioned away from the front end surface of the cut front cover 1C towards the front end thereof by the length of the above-described cutting width W. Therefore, when the cut pump shell 2C and the new front cover 1N are weld re-coupled, the relative relationship between the casing and the pump impellers 5, the turbines 6, the stators 7, and the lockup clutch 8n becomes the same as that of the casing before cutting with the above-described elements 5, 6, 7. 8.

3) In case both a cut front cover 1 and a cut pump shell 2 are used again in weld-recoupling The weld-coupling portion 3 of the front cover 1 and the pump shell 2 is cut, as shown by dotted lines in FIG. 2A, down to the level L of the lower-step surface 4a of one of the front cover 1 and the pump shell 2 in a predetermined cutting width W, e.g., 3 mm, such that the front cover 1 side and the pump shell 2 side are equally cut by, e.g., 1.5 mm, respectively. The front cover 1 and the pump shell 2 are thus separated from each other.

Figure 4:
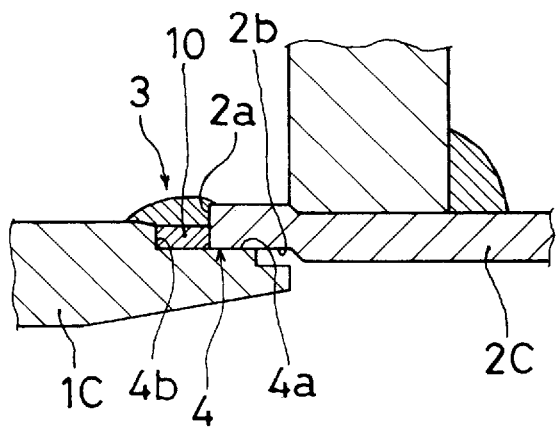
FIG. 4 is a sectional view of the weld-coupling portion of the front cover and the pump shell that have been weld-recoupled according to a third embodiment of the present invention.
Figure 5:
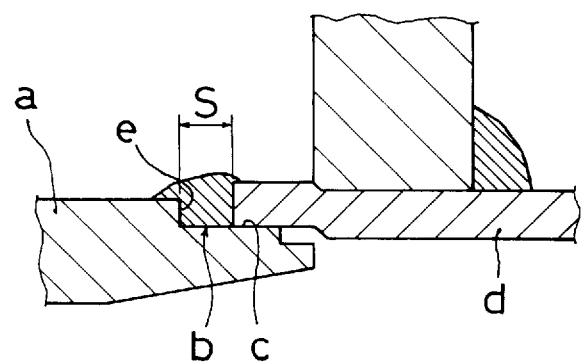
FIG. 5 is a sectional view of a weld-coupling portion of the front cover and the pump shell that have been weld-coupled according to a conventional method.

In this case, as shown in FIG. 4, a spacer ring 10 which has the same width as the above-described cutting width W is used. This spacer ring 10 has preferably a height equal to the thickness of the end surface 2a of the end portion of the cut pump shell 2C or slightly smaller than that.

As shown in FIG. 4, the spacer ring 10 is fit to the lower-step surface 4a of the stepped portion 4 of the cut front cover 1C such that one side surface of the spacer ring 10 is abutted with the stepped surface 4b. Then, the inner peripheral surface 2b of the cut pump shell 2C is fit to the lower-step surface 4a of the cut front cover 1C and the end surface 2a of the end portion of the cut pump shell 2C is abutted with the other side surface of the spacer ring 10. The three members of the front cover 1, the spacer ring 10, and the pump shell 2 are welded together.

According to this method of weld-recoupling, the length from the end surface of the cut front cover 1C to the stepped surface 4b becomes longer than that from the end surface of the front cover 1 before cutting to the stepped surface by half the cutting width. Further, the cut pump shell 2C has an end portion whose length is shorter than that of the end portion of the pump shell 2 before cutting by half the cutting width. There is, however, interposed the spacer ring 10, that is equal in width to the cutting width, between the stepped surface 4b of the cut front cover 1C and the end surface 2a of the cut pump shell 2C. Therefore, when they are weld-recoupled, the relative relationship between the casing and the pump impellers 5, the turbines 6, the stators 7, and the lockup clutch 8 becomes equal to that of the casing before cutting with the above-described elements 5, 6, 7, 8.

In the above-described three methods of weld-recoupling, the stepped portion is provided on an outer peripheral surface of the end portion of the front cover. And the inner peripheral surface of the end portion of the pump shell is fit to the above-described outer peripheral surface to thereby abut the end surface of the pump shell with the stepped surface of the stepped portion. However, in an opposite manner, a stepped portion may be provided in an outer periphery of the end portion of the pump shell so that the inner peripheral surface of the end portion of the front cover is fit to the outer peripheral surface thereof. The end surface thereof may thus be abutted with the stepped surface of the stepped portion.

As described hereinabove, the front cover and the pump shell are separated from each other by cutting and are then positioned by abutting with each other for welding together. Therefore, they can be weld-recoupled at a higher assembling accuracy. In addition, at the time of weld-recoupling, at least one of the front cover and the pump shell can be used again.

It is readily apparent that the above-described method of weld-recoupling a front cover and a pump shell meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of weld-recoupling a front cover and a pump shell of a torque converter, said torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of said end portion of said one thereof with a stepped surface of said stepped portion of the other thereof, said method comprising the steps of:

cutting said weld-coupling portion down to a level of said lower-step surface of the other thereof in such a predetermined cutting width as to evenly cut a front cover side and a pump shell side of said weld-coupling portion in order to separate the front cover and the pump shell apart;

fitting a new replacement of said one thereof to said lower-step surface of said stepped portion of said end portion of the other thereof that has been cut, said new replacement having an end portion whose length is larger by said predetermined cutting width than that of said end portion of said one thereof that has been cut; and thereafter coupling the front cover and the pump shell together by welding them again while abutting an end surface of said end portion of said new replacement with a stepped surface of said end portion of the other thereof that has been cut.

2. A method of weld-recoupling a front cover and a pump shell of a torque converter, said torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of said end portion of said one thereof with a stepped surface of said stepped portion of the other thereof, said method comprising the steps of:

cutting said weld-coupling portion down to a level of said inner peripheral surface of said one thereof at such a predetermined cutting width as to evenly cut a front cover side and a pump shell side of said weld-coupling portion in order to separate the front cover and the pump shell apart;

fitting said inner peripheral surface of said end portion of said one thereof that has been cut to a lower-step surface of a stepped portion of a new replacement of the other thereof, said new replacement having a stepped surface positioned towards an end surface of the other thereof by said predetermined cutting width; and thereafter coupling the front cover and the pump shell by welding them together while abutting an end surface of said end portion of said one thereof that has been cut with said stepped surface of said new replacement.

3. A method of weld-recoupling a front cover and a pump shell of a torque converter, said torque converter having a weld-coupling portion which is formed by fitting an inner peripheral surface of an end portion of one of the front cover and the pump shell to a lower-step surface of a stepped portion formed on an outer peripheral surface of an end portion of the other thereof and then welding them together while abutting an end surface of said end portion of said one thereof with a stepped surface of said stepped portion of the other thereof, said method comprising the steps of:

cutting said weld-coupling portion down to a level of said lower-step surface of the other thereof at such a predetermined cutting width as to evenly cut a front cover side and a pump shell side of said weld-coupling portion in order to separate the front cover and the pump shell apart;

fitting, to said lower-step surface of said stepped portion of the other thereof that has been cut, first a spacer ring having a width equal to said predetermined cutting width in contact with a stepped surface of the other thereof that has been cut and then said inner peripheral surface of said end portion of said one thereof that has been cut such that an end surface thereof contacts said spacer ring; and thereafter coupling the spacer ring, the front cover, and the pump shell together by welding.

* * * * *